Jan. 25, 1949.　　　　E. J. COOK　　　　2,459,870
DIFFERENTIAL LOCK
Filed May 30, 1945　　　　　　　　　　　2 Sheets-Sheet 1
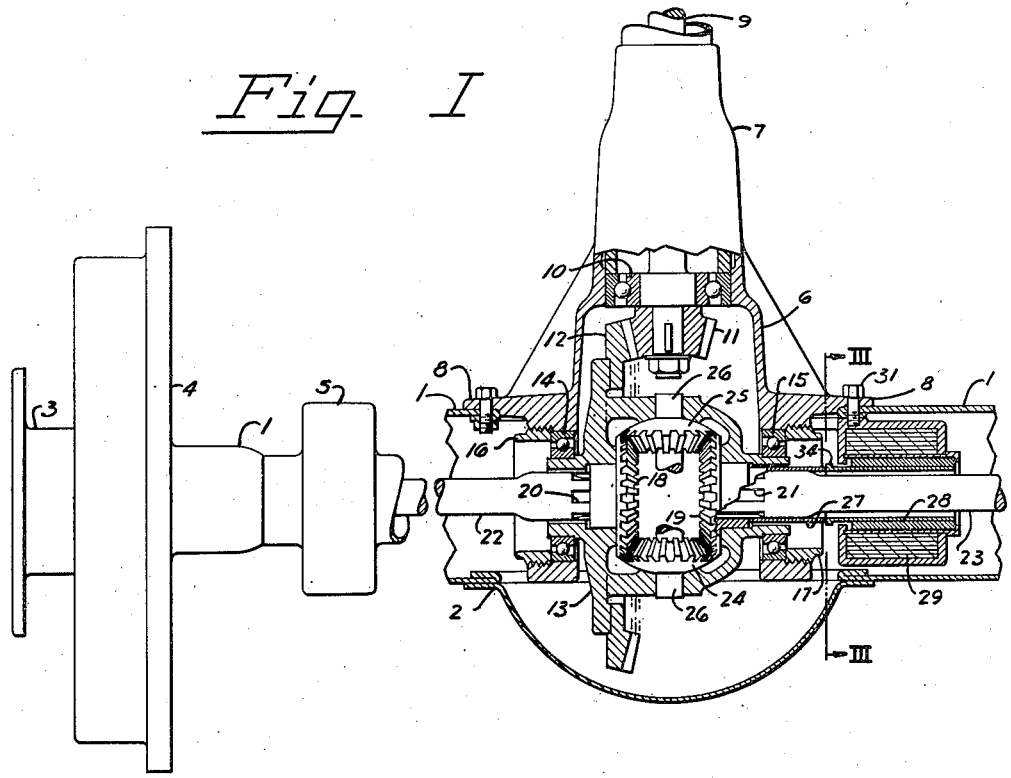
*Fig. I*
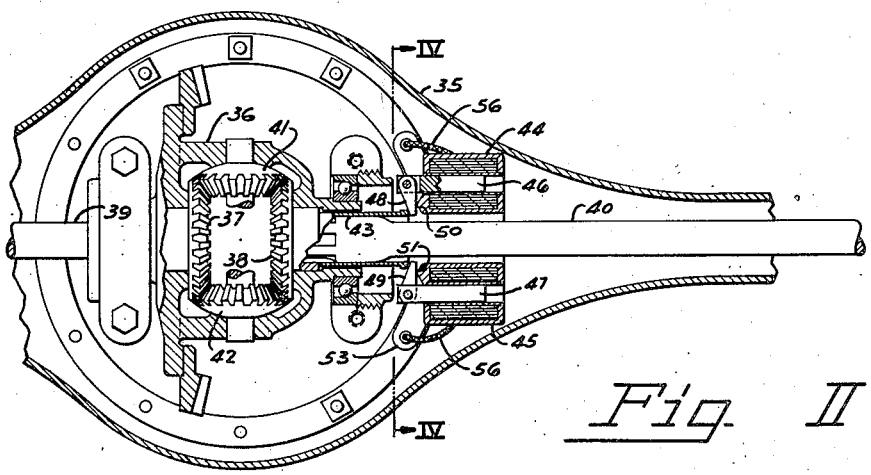
*Fig. II*
INVENTOR.
Everett J. Cook
BY
Marshall & Marshall
ATTORNEYS Jan. 25, 1949.  E. J. COOK  2,459,870
DIFFERENTIAL LOCK
Filed May 30, 1945  2 Sheets-Sheet 2
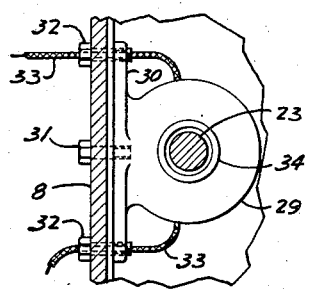
Fig. III
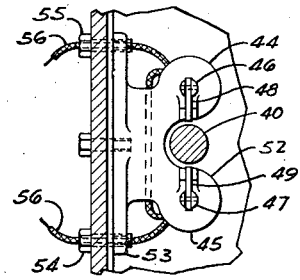
Fig. IV
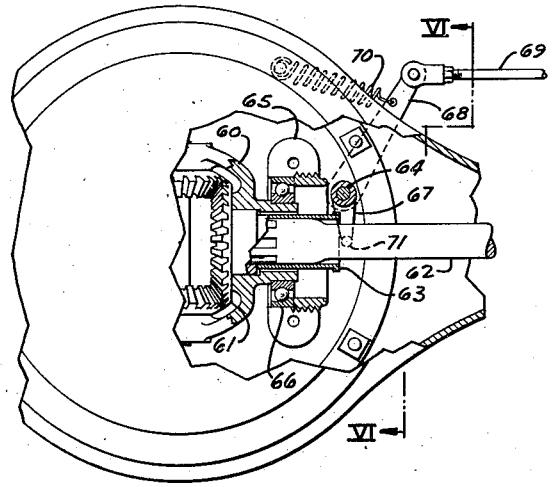
Fig. V
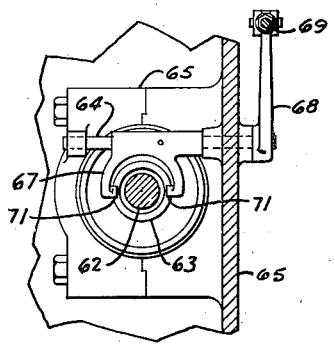
Fig. VI
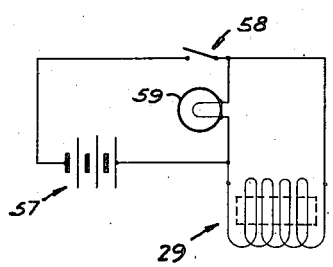
Fig. VII
INVENTOR.
Everett J. Cook
BY
Marshall & Marshall
ATTORNEYS Patented Jan. 25, 1949

2,459,870

UNITED STATES PATENT OFFICE 2,459,870

DIFFERENTIAL LOCK

Everett J. Cook, Toledo, Ohio, assignor to Cook Research Laboratory, Inc., Toledo, Ohio, a corporation of Ohio Application May 30, 1945, Serial No. 596,735

6 Claims. (Cl. 74—712)

This invention relates to differential gear mechanisms such as are used in automotive vehicles for dividing the driving force between the driving wheels and in particular to means for disabling the differential mechanism to permit an unequal division of driving effort or torque between the wheels.

Automotive vehicles in general have differential gearing interposed between the driving wheels so as to maintain substantially equal driving forces on the wheels whether the vehicle be moving in a straight line or going around a curve. In turning a corner either the wheel on the outside of the curve must turn faster than the other wheel or one of the wheels must slide on the ground. The differential gearing prevents sliding of the wheels by maintaining the driving torque to the wheels while permitting relative rotation between them.

Occasionally an emergency arises in which a large difference in tractive effort between the driving wheels occurs, for example one wheel may be on dry pavement while the other wheel is on ice or snow. In such a situation an ordinary differential gear which maintains substantial equality of driving torque regardless of relative rotation between the wheels permits that wheel on dry pavement to remain stationary while the other wheel spins. Advantage cannot be taken of the good traction afforded to the one wheel unless the differential mechanism can be disabled to constrain both wheels to rotate.

The object of this invention is to provide a simple mechanism for disabling or locking differential gearing and thus prevent relative rotation between the driving wheels driven through the differential.

Another object is to provide means for locking differential gearing by forcing the gears into binding engagement with each other.

Another object is to provide a simple electromagnetic structure to provide the force required to lock the differential gear mechanism.

These and other objects and advantages are apparent from the following description in which reference is made to the accompanying drawings illustrating preferred embodiments of the invention.

In the drawings:

Figure I is a plan view, partly in section and with parts broken away, of differential gearing for use in an automotive vehicle which gearing is equipped with locking means according to the invention.

Figure II is a vertical elevation, partly in section and with parts broken away, showing a modified form of electromagnet means adapted to supply the locking force.

Figure III is a fragmentary vertical elevation, partly in section, taken substantially along the line III—III of Figure I.

Figure IV is a vertical elevation, partly in section, as seen from the line IV—IV of Figure II.

Figure V is an elevational view, partly in section and with parts broken away, showing mechanical means for supplying the force required to lock the differential.

Figure VI is a fragmentary vertical section taken substantially along the line VI—VI of Figure V.

Figure VII is a schematic wiring diagram illustrating the method of supplying electrical power to the electromagnet used with the differential locking mechanism.

These specific drawings and the accompanying description are intended merely to illustrate the invention but not to impose limitations upon the claims.

According to the invention the tendency of bevel gears to bind when they are forced too deeply into mesh with each other is utilized to provide the basis for a simple differential gearing lock. In order to secure this binding action one of the bevel differential gears, which is splined on an axle shaft, is permitted a small amount of axial travel toward the center of the differential assembly. During normal operation this gear is urged away from the center of the differential assembly by the forces transmitted through the gear teeth. When it is desired to lock the differential a collar surrounding the axle shaft is forced against the hub of the bevel gear in order to force the gear into binding engagement with the differential pinions. The actuating force transmitted through the collar may be derived from an electromagnet, a mechanical lever, a hydraulic cylinder or any other suitable mechanism. The only requirement is that such power source be under the control of the driver of the vehicle, and it preferably should be of such a type that the operator will not forget to release it when the need for the locking action is past.

A differential lock constructed according to the invention may be installed in a conventional automotive axle. Such an axle comprises two laterally extending tubular sections 1 joined by a differential housing 2. The ends of the tubular sections 1 terminate in wheel bearing supports 3 and brake supports 4 and near the ends are provided with spring pads 5. A differential frame 6 having a forwardly projecting tubular section 7 and an annular flange 8 is adapted to be bolted to the axle so as to complete the housing portion 2. A drive shaft 9 enters through the tubular projection 7 and is journaled therein by ball bearings 10, of which only the bearing at the inner end of the tubular projection 7 is shown. The drive shaft 9 carries a drive pinion 11 which meshes with a ring gear 12 mounted on a differential carrier 13. The differential carrier 13 is rotatably journaled in ball bearings 14 and 15 mounted in the inner end of the differential frame 6 with the axis of rotation of the carrier perpendicular to the drive shaft 9. The axis of the drive shaft 9 may intersect the axis of the differential carrier 13 or it may pass below the latter axis depending upon whether ordinary bevel or hypoid gearing is employed. The differential carrier 13 is axially positioned relative to the drive shaft 9 by threaded rings 16 and 17 so as to secure correct engagement between the bevel pinion 11 and the ring gear 12.

A pair of bevel gears 18 and 19 are journaled in the differential carrier 13 with their axes coinciding with the axis of rotation of the carrier. Ordinary sleeve bearings are provided for these gears because in normal operation there is very little relative rotation between them and the carrier 13. The hubs of the gears 18 and 19 are internally splined to receive splined ends 20 and 21 of axle shafts 22 and 23 positioned within the tubular axle sections 1.

The bevel gears 18 and 19 are operatively connected by a pair of bevel pinions 24 and 25 journaled on a short shaft 26 mounted in the differential carrier 13 transversely to its axis of rotation. The driving force transmitted through the drive shaft 9, the drive pinion 11 and ring gear 12 rotates the differential carrier 13 and with it the shaft 26 carrying the bevel pinions 24 and 25. Because the bevel pinions 24 and 25 are free to rotate on the shaft 26 the force created by the rotation of the differential carrier 13 is applied equally to the bevel gears 18 and 19. If one of the axle shafts 22 or 23 encounters greater resistance to rotation than the other it may slow up or stop while the other axle shaft correspondingly increases its speed. When there is a difference in speed between the shafts 22 and 23 slight differences in torque transmitted to the axles occur depending upon the magnitude of the friction between the bevel gears 18 and 19 and the bevel pinions 24 and 25 meshing therewith and in the bearings supporting these bevel gears. Normally this friction is small so that no substantial inequality of torque exists. During an emergency when the traction condition at one wheel is widely different from that at the other (as may occur when one wheel is on a slippery spot and the other on dry pavement) the friction in the differential mechanism plus the torque delivered to the slipping drive wheel is insufficient to turn the stalled wheel. (In a frictionless differential gearing the torque applied to the stalled wheel is never greater than that required to turn the slipping wheel regardless of the relative rotation between the wheels.) As the friction in the differential gearing is increased more of the driving torque delivered by the differential carrier 13 is applied to the stalled wheel until finally when the differential gearing is locked the driving torque is divided according to the traction conditions at the wheels and both wheels are forced to turn. By using friction instead of positive locking it is possible to keep the slipping wheel turning even though most of the driving torque is applied to the stalled wheel. This type of operation is particularly useful when the sliding wheel is in a hole and must climb out as the vehicle moves ahead.

While various clutches have been devised to lock the bevel gears 18 and 19 to the differential carrier 13 all of these devices have been relatively expensive and difficult to apply. This problem is very simply solved by inducing friction in the differential assembly by crowding the bevel gear 19 into deeper mesh with the bevel pinions 24 and 25. A sleeve 27 loosely mounted on the axle shaft 23 and bearing against the hub of the bevel gear 19 serves to transmit force from an armature 28 of an electromagnet 29 mounted within one of the tubular portions 1 of the axle. The case of the electromagnet 29 is provided with a flanged foot 30 (Fig. III) and is secured in position in the axle by bolting it to the flange 8, utilizing some of the bolts 31 holding the differential frame 6 in the housing 2. For convenience in assembly two of the bolts 31 are made in the form of hollow studs 32 set into the flanged foot 30 so that lead wires 33 of the electromagnet 29 may be brought out through the hollow studs. The wires where they pass through the studs may be surrounded by sealing compound to keep the joint oil tight.

When the electromagnet 29 is energized it draws its armature 28 axially along the shaft 23 so that a tubular extension 34 of the armature 28 strikes the end of the collar 27 and acting therethrough forces the bevel gear 19 into binding engagement with the bevel pinions of the differential assembly thus locking the differential assembly and permitting an unequal distribution of driving torque to the driving wheels. The amount of movement of the gear 19 required to lock it is very small and in consequence the air gap left between the end of the armature 28 and the adjacent part of the case of the electromagnet may be made very small so that the force exerted by the electromagnet is correspondingly great. Constructed in this manner a direct acting electromagnet can supply all the force required to lock the differential.

It is possible to use other forms of electromagnets or in general other forms of force transmitting mechanism for applying force to a bevel gear of a differential assembly in order to lock the assembly. Another example of a force transmitting system is illustrated in Fig. II. In this example a rear axle 35 is shown housing a differential carrier 36 which is similar to the differential carrier 13. A pair of bevel gears 37 and 38 journaled in the carrier 36 have internally splined hubs adapted to receive the splined ends of axle shafts 39 and 40. The bevel gears 37 and 38 are operatively connected by a pair of differential pinions 41 and 42 which in the usual manner permit variations in angular velocity between the axle shafts 39 and 40. As in the preceding example a thin tube or collar 43 circumjacently mounted on the axle shaft 40 adjacent the hub of the bevel gear 38 is used to force the bevel gear 38 into binding engagement with the pinions 41 and 42. Actuating force is applied to the collar 43 by a pair of electromagnets 44 and 45. Armatures 46 and 47 of the electromagnets 44 and 45 are operatively connected to levers 48 and 49 which are fulcrumed on raised edges 50 and 51 of the cases of the electromagnets. Thus when the electromagnets are energized the movement of their armatures rotates the levers 48 and 49 about the fulcrums 50 and 51 so that the other ends of the levers force the collar 43 against the differential gear 38 and thus cause the gears of the differential assembly to bind.

The electromagnets 44 and 45 are mounted on a shallow U-shaped bracket 52 (Fig. IV) having a turned over flange 53 adapted to be bolted to the side of the axle housing 35. As in the preceding example a pair of hollow studs 54 and 55 are provided to accommodate the lead wires 56 of the electromagnet.

In this example the stroke of the armatures of the electromagnets is much longer and the levers are used to multiply the force exerted by the armatures so that adequate binding forces are secured from relatively small electromagnets.

The electromagnets in either of these examples may be energized from the storage battery of the vehicle which is connected to the electromagnet through a suitable switch or relay. A simple wiring diagram (Fig. VII) shows the electromagnet 29 connected to a battery 57 through a normally open switch 58. A pilot light 59 connected in parallel with the magnet 29 serves as a reminder that the lock is energized. The switch 58 may be either a snap switch or a push button switch, although the latter is to be preferred when there is danger that a careless operator might leave the electromagnet energized in spite of the warning afforded by the pilot light 59 and thus discharge the battery 57 unnecessarily. In some cases it would be preferable to use a switch controlled relay in place of the switch 58 so as to keep to a minimum the length of the heavy current carrying wires.

While an electromagnet affords a simple convenient method of applying axial force to a bevel gear of a differential assembly, the beneficial effects of locking the differential may be secured regardless of how the force is applied to the hub of the bevel gear. In a third assembly illustrating the invention a differential carrier 60 journals a bevel gear 61 splined on the end of an axle shaft 62. As in the preceding examples a collar 63 is mounted on the axle shaft 62 adjacent the bevel gear 61. In this example a control shaft 64 is rockably mounted in the frame 65 of the differential adjacent one of the bearings 66 supporting the carrier 60. The control shaft 64 is provided with a downwardly extending yoke 67 straddling the axle shaft 62 and engaging the outer end of the collar 63. The end of the control shaft 64 extending outside the differential frame 65 is provided with an arm 68 to which a control rod 69 is pivotally connected. The initial pull of the control rod 69 is overcome and the lever 68 and yoke 67 are held in inoperative position by the force exerted by a helical tension spring 70 connected between the lever 68 and the differential housing.

When the control rod 69 is actuated by the operator of the vehicle it rotates the control shaft 64 in a clockwise direction as seen in Fig. V so that pins 71 in the ends of the yoke 67 bear against the sleeve 63 and thus force the bevel gear 61 into binding engagement with the other gears of the differential assembly. The only difference between this assembly and the preceding examples is the provision of apparatus employing mechanical rather than electrical means for locking the differential. All the examples employ the binding action which occurs when the bevel gears are forced into excessively deep meshing engagement.

While the invention has been illustrated with electrical and mechanical force transmitting elements it is to be understood that all reasonable modifications and substitutions of other force transmitting elements such as hydraulic systems are included as means for forcing the bevel gear into binding engagement.

This method of locking differential gearing has peculiar advantages over both jaw clutches and ordinary friction brakes. When jaw clutches are employed there is always danger that the clutch may be engaged while one wheel is spinning, i. e., while the differential gears are rotating rapidly, and that the inertia forces from the sudden engagement will damage the clutch. Friction brakes when used in a differential act erratically because they are exposed to the gear lubricant and are subject to all the difficulties encountered in maintaining smooth braking action with a greasy brake. The improved method of locking the differential overcomes these disadvantages in that the locking action takes place in the gear teeth themselves and yet it is not a positive lock like the engagement of a jaw clutch. For these reasons the improved differential lock may be engaged at any time whether the differential is operating or not and the resulting engagement is smooth in its action. In addition to these operative advantages the improved locking means is very simple and easy to install in either new or existing equipment.

Having described the invention, I claim:

1. In a differential gear for equalizing the driving torque between the driving wheels of an automotive vehicle, in combination, a plurality of bevel gears comprising the torque equalizing mechanism of a differential, a collar coaxial with and adjacent the hub of one of the bevel gears, an electromagnet, and a lever system actuated by the magnet and adapted to force the collar against the adjacent bevel gear thereby disabling the differential by driving the adjacent bevel gear into binding engagement with the other bevel gears to permit unequal division of torque to the driving wheels.

2. In a differential gear for equalizing the driving torque between the driving wheels of an automotive vehicle, in combination, a plurality of bevel gears comprising the torque equalizing mechanism of the differential, a sleeve surrounding an output shaft of the differential and positioned adjacent one of the bevel gears, and an electromagnet adapted to act on said sleeve to force the adjacent bevel gear into binding engagement with the other bevel gears, thereby disabling the differential and permitting an unequal division of torque between the driving wheels.

3. In a differential gear mechanism for use in equalizing the driving torque between the driving wheels of an automotive vehicle, a plurality of bevel gears for equally dividing the driving torque, a collar coaxial with and adjacent the hub of one of the bevel gears, a lever system acting against said collar, and means for actuating the lever system thereby forcing the adjacent bevel gear into binding engagement with the other bevel gears.

4. In a differential gear mechanism for use in equalizing the driving torque between the driving wheels of an automotive vehicle, a plurality of bevel gears for equally dividing the driving torque, a collar coaxial with and adjacent the hub of one of the bevel gears, and mechanism acting against said collar, adapted to force the collar against the adjacent bevel gear and thereby disable said differential mechanism by causing binding between the bevel gears.

5. In a differential gear for equalizing the driving torque between the driving axles of an automotive vehicle, in combination, a plurality of bevel gears some of which are in direct operative engagement with the axles for distributing the driving torque between the axles, a member juxtaposed to the hub of one of the bevel gears that directly engages an axle, and means for applying force through the member for forcing the bevel gear into binding mesh with the other bevel gears.

6. In a differential gear for equalizing the driving torque between the driving axles of an automotive vehicle, in combination, a plurality of bevel gears forming a differential mechanism in which some of the gears operatively engage the driving axles, a member mounted concentric with respect to the axles and adjacent the hub of one of the bevel gears, and means for thrusting the member against the bevel gear for forcing the bevel gears into binding engagement with each other.

EVERETT J. COOK.

REFERENCES CITED

The following references are of record in the file of this patent:

UNITED STATES PATENTS

| Number | Name | Date |
|---|---|---|
| 797,292 | Kraut | Aug. 15, 1905 |
| 1,506,915 | Minthorm | Sept. 2, 1924 |